April 10, 1962
J. P. JOHNSON
3,028,687
SATELLITE LOCATOR
Filed Dec. 13, 1960
2 Sheets-Sheet 1
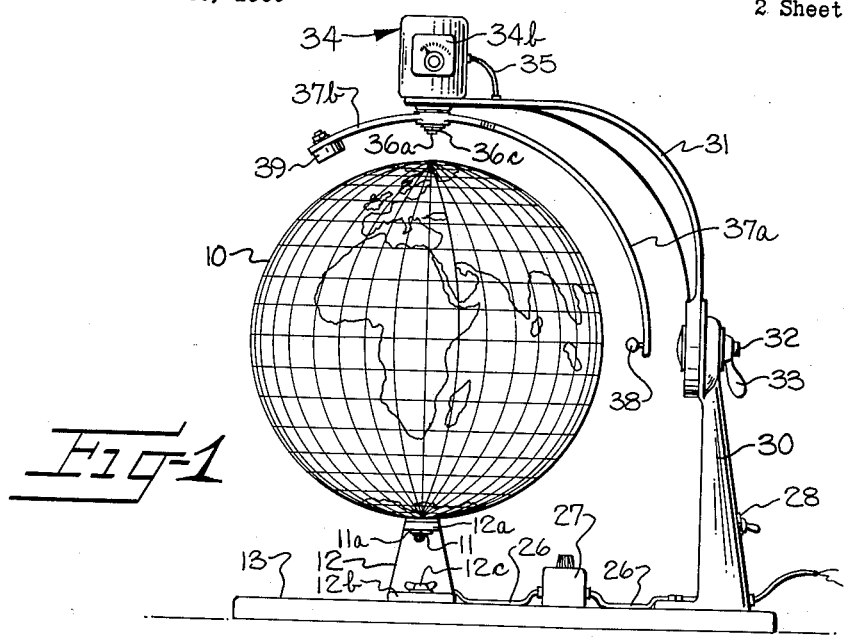
Fig-1
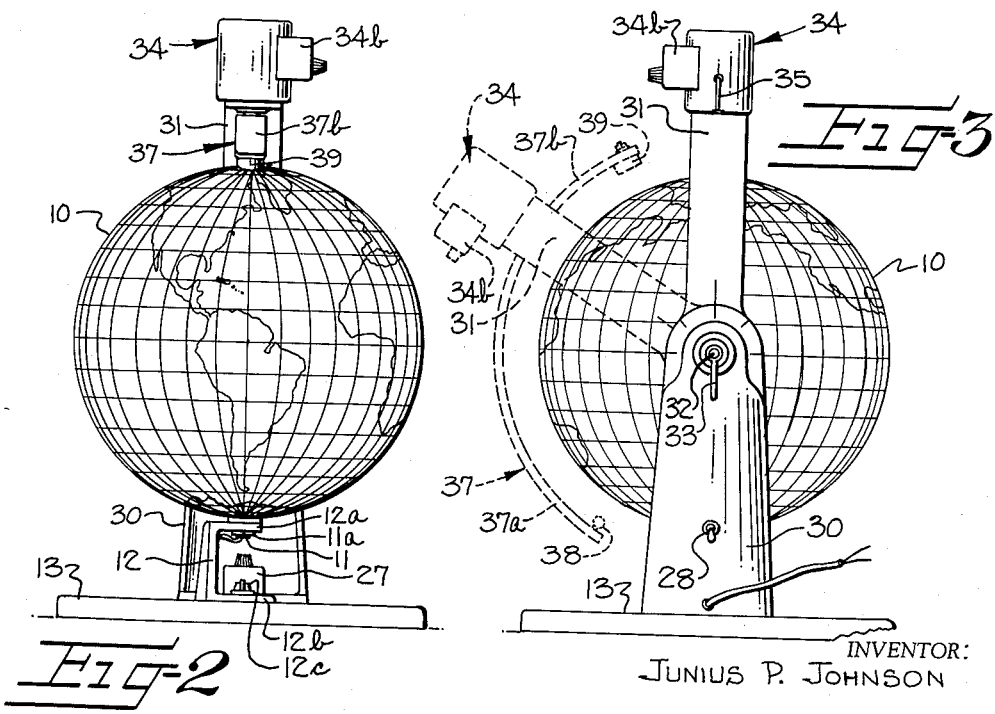
Fig-2
Fig-3
INVENTOR:
JUNIUS P. JOHNSON
BY Eaton, Bell, Hunt & Seltzer
ATTORNEYS

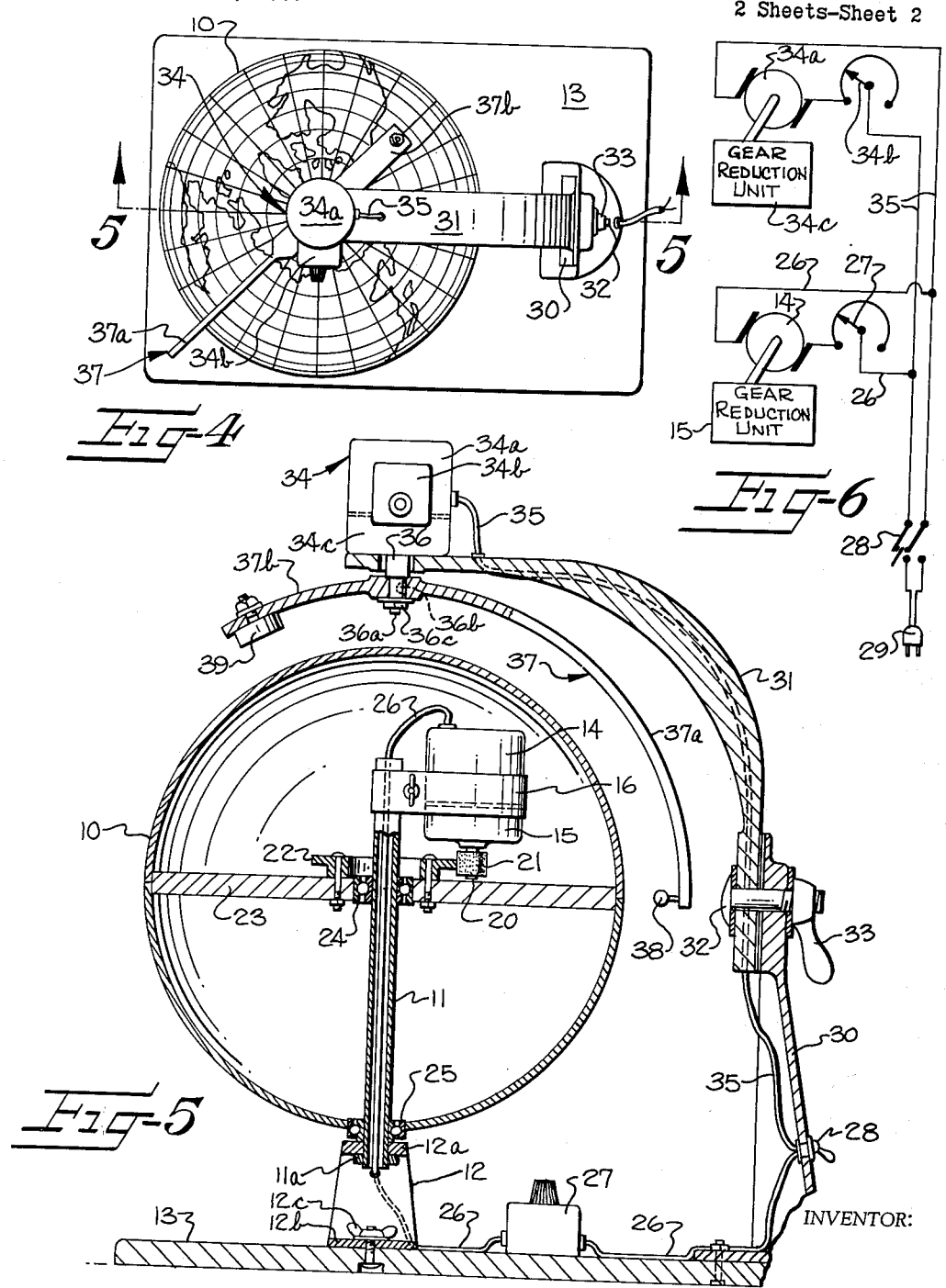

3,028,687
Patented Apr. 10, 1962

3,028,687
SATELLITE LOCATOR
Junius P. Johnson, 1704 Tryon Road, New Bern, N.C.
Filed Dec. 13, 1960, Ser. No. 75,590
9 Claims. (Cl. 35—46)

This invention relates to an educational display device, and more specifically to a device for observing the orbit and for locating the approximate geographical position at any given time of a satellite orbiting around a larger celestial body such as a planet.

With the advent of the so-called "space age," rapidly increasing public interest has evolved in astronomy, space travel and artificial planetary satellites. This interest has been centered to a great extent around the latter, in view of the fact that several artificial satellites have been successfully placed in orbit around the earth. It is the general and wide-spread interest in observing and locating these artificial satellites and their orbits to which this invention is primarily directed.

Accordingly, it is the primary object of this invention to provide a device for observing the orbits of planetary satellites or the like.

It is a more specific object of this invention to provide a device for locating the approximate geographical coordinates and observing the orbital path of an artificial earth satellite.

It is still a further object of this invention to provide a satellite observing and locating device capable of simulating any orbital path of an artificial satellite around the earth or other celestial body.

Some of the objects of the invention having been stated, other objects will appear as the description proceeds, when taken in connection with the accompanying drawings, in which—

FIGURE 1 is a front elevation showing a satellite locating device made in accordance with the present invention and showing the device adjusted in such a manner as to permit the observation of a satellite traveling in an equatorial orbit about the earth;

FIGURE 2 is a side elevation of the device shown in FIGURE 1 looking from the left side thereof;

FIGURE 3 is a side elevation of the device shown in FIGURE 1 looking from the right side thereof, and showing in dotted lines the device adjusted in such a manner as to permit the observation of a satellite traveling in a different orbit about the earth;

FIGURE 4 is a top plan view of the device shown in FIGURE 1;

FIGURE 5 is an enlarged vertical sectional view taken substantially along line 5—5 in FIGURE 4; and FIGURE 6 is a schematic wiring diagram of the electrical circuit used in the apparatus shown in the other figures.

Referring now more specifically to the form of the invention hereof shown in the drawings, a globe 10, representing in this case the earth, is mounted for rotation about its polar axis on a vertically arranged hollow shaft 11 which extends into the globe 10 and runs along its polar axis. The lower end of the hollow shaft 11 is externally threaded and threadably mounted in an opening in an upper horizontally disposed leg 12a of a substantially C-shaped bracket 12. A nut 11a is provided on the lower threaded portion of the shaft 11 for locking the shaft 11 in position. Spaced from the upper leg 12a of the bracket 12 is a lower leg 12b which is, in turn, adjustably secured to a base 13 by any suitable means, such as a wing nut and bolt 12c.

For rotating the globe 10, an electric motor 14 and a gear reduction unit 15 are mounted inside the globe 10 and connected to the upper end of hollow shaft 11 with suitable means such as bracket 16. A shaft 20 extending from and driven by the gear reduction box 15 is provided with a friction wheel 21 fixedly mounted thereon which is positioned in frictional engagement with a horizontally disposed annular ring 22. If desired, in some instances, the wheel 21 and ring 22 may be provided with teeth to provide a more positive drive. The ring 22 surrounds the shaft 11 and is fixedly mounted by any suitable means upon a horizontally disposed disk 23 secured to the inside of the globe 10. The disk 23 has an opening through the center thereof in which a bearing 24 is mounted to surround the shaft 11 to insure freedom of rotation of the globe 10 thereon. Likewise, a bearing 25 is mounted in the lower or south pole of the globe 10 at the juncture of the globe and the shaft 11 for the same reason.

A conductor wire 26 is connected to the electric motor 14 and extends downwardly therefrom through the hollow shaft 11 and outside the globe 10 to a rheostat 27 mounted upon the base 13. The rheostat 27 is, in turn, electrically connected to a switch 28 which is shown in FIGURE 6 as a double pole switch, but which could also be a selector switch or the like. The switch 28 is, in turn connected to an electrical plug 29, connectable to a suitable power source.

For supporting the satellite mechanism, a substantially vertical support 30 is suitably connected to the base 13 at a point spaced from the globe 10. One end of an arcuate support 31 is adjustably connected to the upper end of the vertical support 30 for pivotal movement thereon by a bolt 32 and wing nut 33, or other suitable means. As shown, the pivotal axis of the supports 30 and 31 is positioned at a point in horizontal alignment with the equator of the globe 10. The other end of the arcuate support 31, as shown in FIGURES 1 and 5, extends over the adjacent area of the globe 10 and terminates slightly beyond the axis of rotation of the globe.

The free end of the arcuate support 31 extending over the globe 10 supports a driving unit 34 which includes a motor 34a, a rheostat 34b and a gear reduction unit 34c. A conductor wire 35 connected to the driving unit 34 extends downwardly therefrom and is electrically connected to the switch 28.

A shaft 36, driven by the driving unit 34, extends through a hole in the support 31, this hole being somewhat larger than the shaft 36 to thereby permit unimpeded rotation of the shaft. This shaft 36 is so positioned that its axis of rotation is normal to the pivotal axis of the supports 30 and 31 while at the same time always lying on an imaginary line which bisects a polar great circle on the globe. The shaft 36 has a reduced outer end 36a of substantially less diameter than that portion of the shaft 36 which extends through the arcuate support 31. An arcuate arm 37, having a long leg portion 37a and a short leg portion 37b, conforming substantially to the curvature of the globe 10 is suitably connected intermediate its ends to the outer end 36a of the shaft 36 by a key 36b and nut 36c, for example. As shown in FIGURE 5, the arm 37 rests against the shoulder formed by the reduced shaft end 36a. Thus, the arm 37 is prevented from coming into contact and binding with the support 31.

A satellite 38 is connected to the end of the longer leg 37a of the arm 37 and spaced from the juncture of shaft 36 and arm 37 at such a distance that it always lies in an imaginary great circle normal to the axis of rotation of the arm 37. A counter balance 39 is connected to the shorter leg 37b of the arm 37 to compensate for the differential in weight of the arm 37 on each side of its pivot point.

As pointed out above, the globe 10 is mounted for rotation about its polar axis. Upon activation of the motor 14 by the switch 28 power is transmitted through the gear reduction unit 15 to the friction wheel 21 which, in turn, imparts rotation to the globe through the annular ring 22 connected to the globe 10. The speed of rotation of the globe is controlled by the rheostat 27 and would normally be set for one revolution every 24 hours when the globe represents the earth. This speed could, of course, be varied depending upon the desires of the operator in simulating the path of a satellite around a planetary body.

It should be noted that the globe 10, which represents the earth in this case, rotates on a vertical axis while it is well known that the earth does not, in reality, rotate about a truly vertical axis with respect to the sun in our solar system. This is purely a matter of choice in this case since the true axis of the earth with respect to the sun is of no importance in the instant invention because we are only concerned here with the relative relation of satellites to planetary bodies.

The closing of the switch 28 also energizes the motor 34a to transmit power therefrom through the gear reduction unit 34c to rotate the arm 37 which carries the simulated satellite 38. The speed of this rotation is controlled by the rheostat 34b and would be set at any desired speed depending upon the speed of the particular actual or theoretical satellite which is being simulated as will be pointed out in greater detail below.

As is well known, when certain conditions of speed and distance are satisfied, a satellite will travel in a constant orbit around a planetary or other celestial body for an indefinite period. Simply stated, this is due to the fact that the gravitation pull of the greatly larger body which tends to attract the satellite is substantially equalized by the speed of the satellite which tends to force the satellite away from the gravitational pull of the body. The directional orbit of the satellite is quite exact as long as no force is introduced to change it. Furthermore, the orbit can assume any number of imaginary great circles having various angles with respect to the body's axis.

Thus, the instant invention is designed to simulate the directional orbit of any satellite traveling about a greatly larger celestial body. This versatility is achieved primarily by the adjustability of the arcuate support 31 about its pivot point located at the juncture of supports 30 and 31. More specifically, referring to FIGURE 1 of the drawings, the support 31 is in its uppermost position, thereby placing the axis of rotation of the arcuate arm 37 directly over the north pole of the globe 10 and in alignment with the polar axis thereof. In this position the satellite 38 lies in an imaginary great circle concentric with the equator of the globe and would subscribe an equatorial orbit about the globe.

The provision of the bolt 32 and wing nut 33 at the pivot point between the supports 30 and 31 allows the support 31 to be adjustably secured at any position along its pivotal path which path is preferably 90 degrees on each side of the vertical position to afford maximum versatility to the apparatus. Thus, one of many alternative orbits is achieved as shown in FIGURE 3 in dotted lines. Here, the support 31 is pivoted away from the vertical axis of the apparatus at an angle of about 45 degress, thus placing the axis of rotation of arm 37 about midway between the north pole and the equator of the globe and placing the satellite in an orbit subscribing an imaginary great circle normal to the axis of rotation of arm 37. Similarly, a true polar orbit could be effectuated by pivoting the support 31 away from the vertical axis of the apparatus at an angle of 90 degrees.

In cases of polar and near polar orbits, obviously the satellite must pass directly or almost directly beneath the globe 10, or stated otherwise, above or almost above the south pole. It is for this reason that the apparatus herein is provided with the C-shaped bracket 12 which allows the satellite to pass through this area without interference from the globe supporting means. As pointed out above, the bracket 12 is secured to the base 13 by the bolt and wing nut 12a which can be loosened to permit the swiveling of the bracket 12 to any desired position.

In order to set the herein described apparatus into operation to simulate the path of an artificial satellite orbiting the earth, for example, the rheostat 27 is set so as to permit one revolution of the globe per day. Thereafter, upon determination of the direction and speed of a known satellite and its geographical coordinates at a given time, (1) the support 31 is pivoted and fixed at the proper angle to give the correct angle of the satellite's orbit, (2) the arm 37 is rotated so as to place the satellite 38 over the correct geographical coordinates on the globe at the exact time the apparatus is to be actuated, and (3) the rheostat 34b is set so as to cause the satellite 38 to make one orbit around the globe 10 each time the actual satellite completely orbits the earth.

The direction, speed and location of certain artificial earth satellites is readily obtainable from United States Government publications, thus enabling anyone to obtain the necessary data to operate the apparatus herein. Furthermore, such data is generally available also with respect to natural satellites, or moons, which orbit some of the planets of our solar system, thus enabling one to also simulate these orbits.

Finally, it should be pointed out that the device herein described is for educational and for illustrative purposes and thus accuracy has, in some facets, been sacrificed for simplicity. For example, no provision is made in the specific embodiment described herein for simulating the relative altitude of a satellite with respect to its planetary body which may vary in a given situation. Furthermore, the earth specifically shown herein is depicted as being perfectly round, while it is well known that such is not the case.

In the drawings and specification there has been set forth a preferred embodiment of the invention and, although specific terms are employed, they are used in a generic and descriptive sense only and not for purposes of limitation, the scope of the invention being defined in the claims.

I claim:

1. An educational display device for locating the approximate geographical coordinates and observing the orbit of a planetary satellite or the like, comprising a base, a globe having a polar axis, means mounting said globe for rotation about its polar axis on said base and having a configuration defining a clearance beneath said globe in axial alignment with the polar axis thereof, an elongate rotatable arm spaced from said globe and having an axis of rotation normal to the length of the arm, a simulated satellite mounted upon said arm for rotation therewith, said satellite lying in an imaginary great circle normal to the axis of rotation of said arm, and means carried by said base for rotatably supporting said arm and for varying the position of said arm and for changing the position of the imaginary great circle subscribed by said satellite with respect to the globe, said mounting means comprising a mounting element pivotally connected to said globe and said base and elevating said globe above said base in spaced relationship so as to provide the unobstructed clearance therebetween, said mounting element being pivotally movable with respest to said base and said globe to a position out of a path taken by said simulated satellite in describing polar and near-polar orbits.

2. A device according to claim 1, wherein said mounting element is a substantially C-shaped bracket having a pair of spaced apart, horizontally disposed legs, and a substantially vertically disposed bridging portion therebetween, said bridging portion being spaced from and pivotal about an imaginary extension of said polar axis.

3. An educational display device for locating the approximate geographical coordinates and observing the orbit of a planetary satellite or the like, comprising a base, a globe having a polar axis, means mounting said globe for rotation about its polar axis on said base and having a configuration defining a clearance beneath said globe in axial alignment with the polar axis thereof, power means operatively connected to said globe for imparting rotation thereto, an elongate rotatable arm spaced from said globe and having an axis of rotation normal to the length of the arm, power means operatively connected to said arm for imparting rotation thereto, a simulated satellite mounted upon said arm for rotation therewith, said satellite lying in an imaginary great circle normal to the axis of rotation of said arm, means carried by said base for rotatably supporting said arm and for varying the position of said arm and for changing the position of the imaginary great circle subscribed by said satellite with respect to the globe, and means for varying the speed of rotation of said globe and said arm relative to each other, said mounting means comprising a mounting element pivotally connected to said globe and said base and elevating said globe above said base in spaced relationship so as to provide the unobstructed clearance therebetween, said mounting element being pivotally movable with respect to said base and said globe to a position out of a path taken by said simulated satellite in describing polar and near-polar orbits.

4. An educational display device for locating the approximate geographical coordinates and observing the orbit of a planetary satellite or the like, comprising a base, a globe having a polar axis, means mounting said globe for rotation about its polar axis on said base and having a configuration defining a clearance beneath said globe in axial alignment with the polar axis thereof, power means operatively connected to said globe for imparting rotation thereto, an elongate rotatable arm spaced from said globe and having an axis of rotation normal to the length of the arm, power means operatively connected to said arm for imparting rotation thereto, a simulated satellite mounted upon said arm for rotation therewith, said satellite lying in an imaginary great circle normal to the axis of rotation of said arm, means carried by said base for rotatably supporting said arm and for varying the position of said arm and for changing the position of the imaginary great circle subscribed by said satellite with respect to the globe, means for varying the speed of rotation of said globe, and additional means independent of said last recited means for varying the speed of rotation of said arm, said mounting means comprising a mounting element pivotally connected to said globe and said base and elevating said globe above said base in spaced relationship so as to provide the unobstructed clearance therebetween, said mounting element being pivotally movable with respect to said base and said globe to a position out of a path taken by said simulated satellite in describing polar and near-polar orbits.

5. An educational display device for locating the approximate geographical coordinates and observing the orbit of a planetary satellite or the like, comprising a base, a globe having a polar axis, means mounting said globe for rotation about its polar axis on said base and having a configuration defining a clearance beneath said globe in axial alignment with the polar axis thereof, an elongate rotatable arm spaced from said globe and having an axis of rotation normal to the length of the arm, a simulated satellite mounted upon said arm for rotation therewith, said satellite lying in an imaginary great circle normal to the axis of rotation of said arm, pivotal means supporting said arm for varying the position thereof and for changing the position of the imaginary great circle subscribed by the satellite with respect to the globe, and means carried by the base for supporting said pivotal means, said mounting means comprising a mounting element pivotally connected to said globe and said base and elevating said globe above said base in spaced relationship so as to provide the unobstructed clearance therebetween, said mounting element being pivotally movable with respect to said base and said globe to a position out of a path taken by said simulated satellite in describing polar and near-polar orbits.

6. An educational display device for locating the approximate geographical coordinates and observing the orbit of a planetary satellite or the like, comprising a base, a globe having a polar axis and an equator and being mounted for rotation about its polar axis on said base, power means operatively connected to said globe for rotating said globe, a substantially upright support carried by the base and being spaced from the globe, and elongate support having one end thereof adjustably connected to said upright support for pivotal movement at a point or an imaginary plane defined by the equator and having the other end thereof extending toward the globe and normally lying over the North Pole thereof when pivoted to a vertical position, an elongate arcuate arm substantially conforming to the curvature of said globe positioned between said elongate support and said globe, said arm being rotatably mounted intermediate its ends on the other end of said elongate support, a simulated satellite mounted upon said arm and lying in an imaginary great circuit normal to the axis of rotation thereof, and power means operatively connected to said arm for imparting rotation thereto to thereby move said satellite in an orbit around said globe.

7. An educational display device for locating the approximate geographical coordinates and observing the orbit of a planetary satellite or the like, comprising a base, a globe having a polar axis and an equator and being mounted for rotation about its polar axis on said base, power means operatively connected to said globe for rotating said globe, a substantially upright support carried by the base and being spaced from the globe, an elongate support having one end thereof adjustably connected to said upright support for pivotal movement at a point on an imaginary plane defined by the equator and having the other end thereof extending toward the globe and normally lying over the North Pole thereof when pivoted to a vertical position, an elongate arcuate arm substantially conforming to the curvature of said globe positioned between said elongate support and said globe, said arm being rotatably mounted intermediate its ends on the other end of said elongate support, a simulated satellite mounted upon said arm and lying in an imaginary great circle normal to the axis of rotation thereof, power means operatively connected to said arm for imparting rotation thereto to thereby move said satellite in an orbit around said globe, and means for varying the speed of rotation of said globe and said arm relative to each other.

8. An educational display device for locating the approximate geographical coordinates and observing the orbit of a planetary satellite or the like, comprising a base, a shaft, means mounting said shaft in a substantially upright position on said base and having a configuration defining an unobstructed clearance between the lower end of the shaft and the base, a globe having a polar axis and being mounted for rotation about its polar axis on said shaft, power means mounted on the upper end of said shaft and within said globe for rotating said globe, an elongate rotatable arm spaced from said globe and having an axis of rotation normal to the length of the arm, a simulated satellite mounted upon said arm for rotation therewith, said satellite lying in an imaginary great circle normal to the axis of rotation of said arm, means adjustably supporting said arm for varying the position of said arm and for changing the position of the imaginary great circle subscribed by the satellite with respect to the globe, and means carried by the base for supporting said last recited means, said mounting means comprising a mounting element pivotally connected to said lower end of said shaft and to said base and elevating said lower end above said base in spaced relationship so as to provide the unobstructed clearance therebetween, said mounting element being pivotally movable with respect to said base and said lower end of said shaft to a position out of a path taken by said simulated satellite in describing polar and near-polar orbits.

9. An educational display device for locating the approximate geographical coordinates and observing the orbit of a planetary satellite or the like, comprising a base, a shaft, means carried by the base for supporting the shaft in substantially upright position and having a configuration providing an unobstructed clearance between the lower end of the shaft and the base, a globe having a polar axis and an equator and being mounted for rotation about its polar axis on said shaft, power means mounted on the upper end of said shaft and within said globe for rotating said globe, a substantially upright support carried by the base and being spaced from the globe, an elongate support having one end thereof adjustably connected to said upright support for pivotal movement relative thereto at a point on an imaginary plane defined by the equator and having the other end thereof extending toward the globe and normally lying over the North Pole thereof when pivoted to a vertical position, an elongate arcuate arm substantially conforming to the curvature of said globe positioned between said elongate support and said globe and in close proximity to said globe, said arm being rotatably mounted intermediate its ends on the other end of said elongate support, a simulated satellite mounted upon said arm and lying in an imaginary great circle normal to the axis of rotation thereof, and power means operatively connected to said arm for imparting rotation thereto to thereby move said satellite in an orbit around the globe.

References Cited in the file of this patent

UNITED STATES PATENTS

| | | |
|---|---|---|
| 431,649 | Currie | July 8, 1890 |
| 2,532,402 | Herbold | Dec. 5, 1950 |
| 2,985,969 | Farquar | May 30, 1961 |

FOREIGN PATENTS

| | | |
|---|---|---|
| 335,110 | Switzerland | Feb. 14, 1959 |

UNITED STATES PATENT OFFICE
CERTIFICATE OF CORRECTION

Patent No. 3,028,687                                April 10, 1962

Junius P. Johnson

It is hereby certified that error appears in the above numbered patent requiring correction and that the said Letters Patent should read as corrected below.

Column 6, line 22, for "circuit" read -- circle --.

Signed and sealed this 31st day of July 1962.

(SEAL)
Attest:

ERNEST W. SWIDER                              DAVID L. LADD
Attesting Officer                               Commissioner of Patents